United States Patent
Pesavento

(10) Patent No.: US 7,648,662 B2
(45) Date of Patent: *Jan. 19, 2010

(54) METHOD AND DEVICE FOR PROCESSING PREFORMS

(75) Inventor: Modesto M. Pesavento, Schmalkalden (DE)

(73) Assignee: Husky Injection Molding Systems Ltd. (CA)

( * ) Notice: Subject to any disclaimer, the term of this patent is extended or adjusted under 35 U.S.C. 154(b) by 883 days.

This patent is subject to a terminal disclaimer.

(21) Appl. No.: 10/510,915

(22) PCT Filed: Apr. 10, 2003

(86) PCT No.: PCT/DE03/01202

§ 371 (c)(1),
(2), (4) Date: Oct. 12, 2004

(87) PCT Pub. No.: WO03/086728

PCT Pub. Date: Oct. 23, 2003

(65) Prior Publication Data

US 2005/0147712 A1 Jul. 7, 2005

(30) Foreign Application Priority Data

Apr. 10, 2002 (DE) ................................ 102 15 722

(51) Int. Cl.
*B29C 49/64* (2006.01)
(52) U.S. Cl. .................. 264/237; 264/530; 425/392; 425/526; 425/538; 425/547
(58) Field of Classification Search ................ 425/547, 425/526, 538, 392; 264/237, 530
See application file for complete search history.

(56) References Cited

U.S. PATENT DOCUMENTS

| 3,078,508 | A |   | 2/1963 | Martin, Jr. |
| 3,170,970 | A |   | 2/1965 | Adams |
| 3,947,205 | A |   | 3/1976 | Edwards |
| 4,034,036 | A | * | 7/1977 | Farrell ......................... 264/526 |
| 4,047,873 | A |   | 9/1977 | Farrell |
| 4,102,626 | A |   | 7/1978 | Scharrenbroich |

(Continued)

FOREIGN PATENT DOCUMENTS

DE        1 815 114        6/1970

(Continued)

OTHER PUBLICATIONS

Patent Abstracts of Japan for JP 61-120723, published Jun. 7, 1986, [retreived online on Jan. 27, 2005], retreived from internet <URL https://www.delphion.com/cgi-bin/viewpat.cmd/JP61120723A2>.

(Continued)

*Primary Examiner*—Robert B Davis
(74) *Attorney, Agent, or Firm*—Katten Muchin Rosenman LLP

(57) ABSTRACT

A method and a device for processing preforms which are made of a thermoplastic plastic material and are blow molded into containers. In a first production process, the preforms are produced by injection molding in the area of an injection molding tool. At least some areas of the preforms are impinged upon by a cooling device. The preforms are deformed by applying negative pressure, wherefore the cooling device can be made at least in part of a porous material.

42 Claims, 7 Drawing Sheets

U.S. PATENT DOCUMENTS

Figure 1:
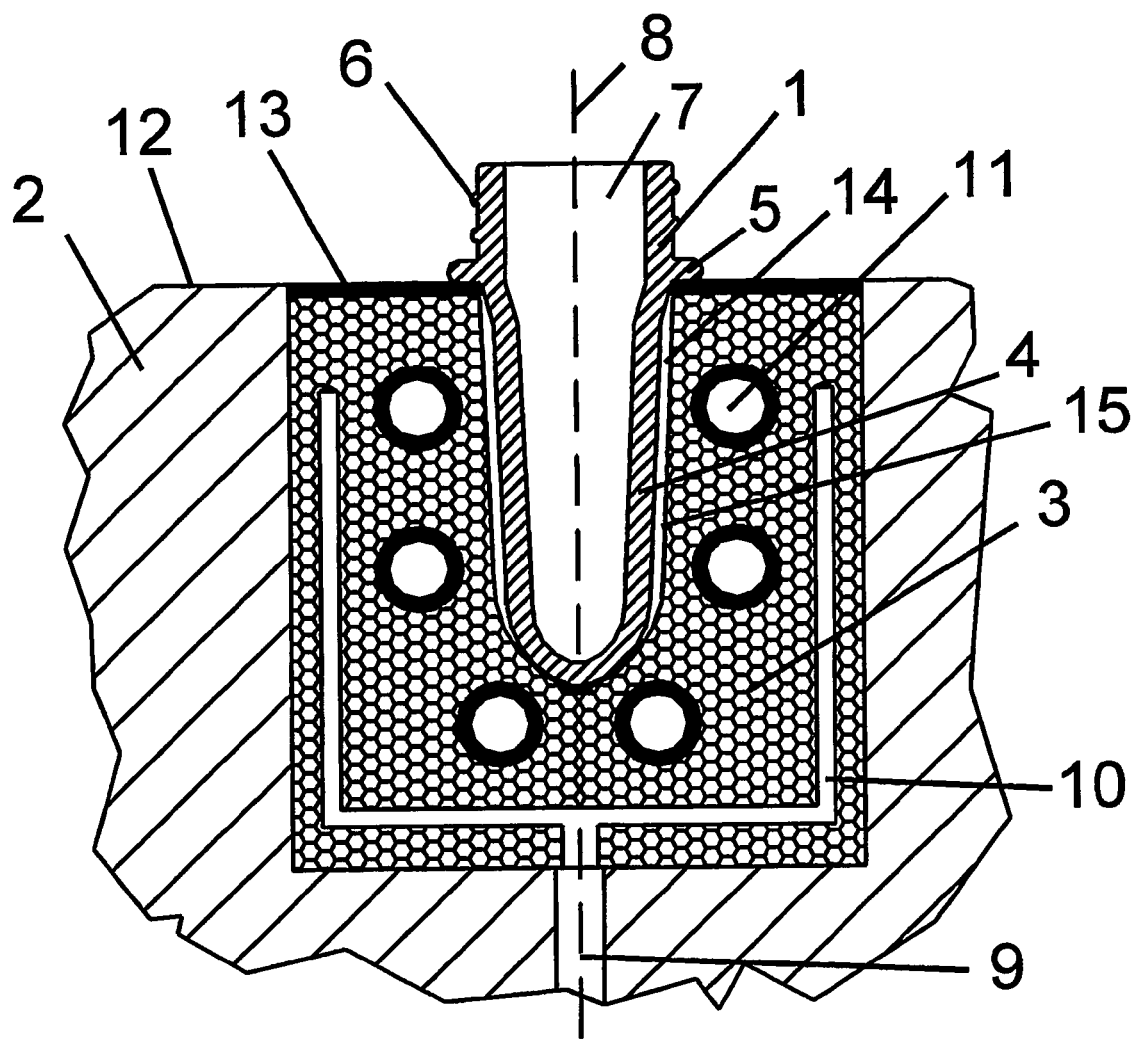

| | | | |
|---|---|---|---|
| 4,115,949 | A | 9/1978 | Avron et al. |
| 4,208,177 | A | 6/1980 | Allen |
| 4,295,811 | A | 10/1981 | Sauer |
| 4,304,542 | A | 12/1981 | Sauer |
| 4,309,380 | A | 1/1982 | Sauer |
| 4,592,719 | A | 6/1986 | Bellehache et al. |
| 4,690,633 | A | 9/1987 | Schad et al. |
| 4,729,732 | A | 3/1988 | Schad et al. |
| 4,872,827 | A | 10/1989 | Noda |
| 4,903,380 | A | 2/1990 | Kirby |
| 5,051,085 | A | 9/1991 | Masumoto |
| 5,217,729 | A * | 6/1993 | Terauchi et al. ............. 425/522 |
| 5,460,761 | A * | 10/1995 | Larsson ....................... 264/39 |
| 5,788,926 | A | 8/1998 | Oda et al. |
| 5,804,127 | A | 9/1998 | Takatori et al. |
| 5,837,299 | A | 11/1998 | Bright et al. |
| 5,850,590 | A | 12/1998 | Furuta et al. |
| 6,042,361 | A | 3/2000 | Murphy |
| 6,171,541 | B1 | 1/2001 | Neter et al. |
| 6,190,157 | B1 | 2/2001 | Hofstetter et al. |
| 6,332,770 | B1 * | 12/2001 | Oueslati et al. ............. 425/547 |
| 6,461,556 | B1 | 10/2002 | Neter |
| 6,475,442 | B1 | 11/2002 | Thompson et al. |
| 6,737,007 | B2 | 5/2004 | Neter et al. |
| 6,951,453 | B2 * | 10/2005 | Neter et al. ................. 425/526 |
| 2001/0048988 | A1 | 12/2001 | Forte et al. |
| 2002/0074687 | A1 | 6/2002 | Neter et al. |
| 2002/0088767 | A1 | 7/2002 | Saito et al. |
| 2002/0179613 | A1 | 12/2002 | Matsui et al. |
| 2003/0096661 | A1 | 5/2003 | Kim |
| 2003/0167799 | A1 | 9/2003 | Tijerina-Ramos et al. |

FOREIGN PATENT DOCUMENTS

| | | |
|---|---|---|
| DE | 41 28 438 A1 | 3/1993 |
| EP | 0 266 804 A2 | 5/1988 |
| EP | 0 763 415 A | 3/1997 |
| EP | 0 947 304 A2 | 10/1999 |
| JP | 61-120723 | 6/1986 |
| SU | 482243 | 2/1976 |
| SU | 673161 | 7/1979 |
| WO | WO 97/39874 | 10/1997 |
| WO | 00/24562 A1 | 5/2000 |

OTHER PUBLICATIONS

Scott W. Hopkins, Porous Aluminum Mold Materials:"The New Thermoform Tooling Advantage", International Mold Steel, Inc, published in the year 2000 [retrieved on Apr. 29, 2005] retrieved from internet < URL http://www.imsteel.com/productpdf/porous_aluminum_molds2_020702.pdf>.

Mikell Knights, Porous Molds' Big Draw, Plactics Technology Online, Mar. 2001, [retrieved on Jul. 27, 2002], retrieved online < URL http://www.plasticstechnology.com/articles/200103fa1.html>.

Patent Abstracts of Japan, vol. 005, No. 190 (M-100), Dec. 4, 1981 & JP 56 113433 A (Inoue MTP Co Ltd), Sep. 7, 1981.

Patent Abstracts of Japan, vol. 1996, No. 2, Feb. 29, 1996 & JP 07 276485 A, Oct. 24, 1995.

* cited by examiner

METHOD AND DEVICE FOR PROCESSING PREFORMS

This application is a 371 of International Application No. PGT/DE2003/00 1202, filed Apr. 10, 2003, which claims priority of DE 102 15 722.7, filed Apr. 10, 2002, incorporated herein by reference.

The invention relates to a method for processing preforms made from a thermoplastic plastic and intended for blow molding into containers and which are produced by injection molding in an injection molding tool and are deformed after removal from the injection molding tool.

The invention further relates to a device for processing preforms made from a thermoplastic plastic and intended for blow molding into containers and which are produced by injection molding in an injection molding tool, in which the preforms are impinged upon by at least one cooling device.

A method for processing preforms is described, for example, in PCT-WO 97/39874. Here the preforms, after removal from the injection tool, are transferred into cooling sleeves and pressed against the wall of the cooling sleeve by being impinged with internal pressure. In this manner the contact of the preform with the wall of the cooling sleeve is maintained during the entire cooling procedure, since any shrinkage of the preform as a result of cooling can be compensated for by the internal pressure acting upon it.

A blow molding deformation of preforms into containers inside a blow mold is disclosed in DE 41 28 438 A1. In this case the blow mold is provided with porous plugs which are connected to a pressure source. Compressed air is applied to the porous plugs providing a compressed air cushion which prevents surface damage to the blown container from the material sliding on the inner surface of the blow mold.

The object of the present invention is to improve a method of the kind described at the outset and which supports production of preforms requiring little time and with a simple physical layout.

This object is achieved according to the invention in that the preforms are deformed by the action of negative pressure.

A further object of the invention is to construct a device of the kind described at the outset which facilitates processing of the preforms by means of a simple mechanical design and at a low production cost of the device.

This object is achieved according to the invention in that at least part of the area of the cooling device is formed from a porous material.

The deformation of the preforms by the action of negative pressure following the manufacture by injection molding of the preforms confers a series of advantages. One advantage is that the preform can be drawn against the walls of a cooling sleeve by an external negative pressure and in this way direct contact between the preform and the wall of the cooling sleeve is maintained throughout the entire cooling process.

A further advantage can be seen in that negative pressure can be applied so that a deformation of the preform can take place longitudinally, radially and/or in a circumferential direction relative to the longitudinal axis of the preform, so that the preform can be given a conformation differing from the contour of the injection molding tool cavities. More particularly, the possibility exists of generating, by application of negative pressure, a distribution of material in the wall of the preform which would be beneficial for the subsequent production of oval bottles by blow molding. In this way, varying wall thickness could be provided in the circumferential direction of the preform.

Yet a further advantage consists in that preforms that are unintentionally deformed or have not been molded to their full extent by the injection molding tool can be remolded. In this way any warped preforms can be corrected or preform deformations compensated for. More particularly it is considered that, in the use of the method according to the invention and/or the device according to the invention, cycle times in the area of the injection molding tool can intentionally be reduced, or increased tolerances specified in the tool geometries of the injection molding tool. In such an intentionally premature deformation of the preform, warping of a preform that is ejected when it is too hot or the formation of shrink marks can be accepted, since these defects in the preform can be compensated for during remolding by the application of negative pressure. The very costly injection tool can in this way be operated with an increased productivity.

A typical deforming process takes place in such a way that the negative pressure acts on the preform externally.

It is also possible to have the negative pressure act on the preform internally.

A preferred embodiment consists in that the preforms are impinged by negative pressure inside a cooling device.

A low-cost supply of negative pressure can be achieved by applying the negative pressure to the preform through a porous material.

To achieve a uniform distribution of the negative pressure it is proposed that the negative pressure be applied to the porous material through negative pressure channels.

Handling of the preforms can be facilitated by the fact that the preforms are locally acted on by a pressurizing medium.

An additional impact on the sequence of the process can arise from the fact that the preforms are temporarily acted on by a pressurizing medium.

Improved control means are thereby provided to apply negative pressure to the preforms through local porous inserts.

An input of locally varying pressure conditions along an inner boundary of the cavity receiving the preform can be achieved by means of local porous inserts some of which are controllably connected to a pressure source and to a negative pressure source by means of control valves.

Deformation of the preform from the inside outwards can be achieved through the use of a porous (inner) mandrel.

A locally limited deformation of material is supported by applying local negative pressure on the preform from the mandrel.

A typical application consists of deforming the preform as an intermediate step in a single-stage injection-blow process.

It is also possible for the deformation of the preform to be performed as an intermediate step in the performance of a dual-stage injection-blow process.

An advantageous embodiment of the invention can be achieved by locating the porous material in the area of a cooling sleeve.

To provide sufficient mechanical stability, it is proposed to configure the porous material as an insert held in place by a frame.

Application of negative pressure inside the porous material with low flow resistances is achieved by locating at least one negative pressure channel in the area of the insert.

According to a further design embodiment, at least one cooling channel is located in the region of the frame.

The screening off of pressure from the outer environment can be achieved by covering at least some of the area of the insert with a seal.

To enable a pressure-supported mobility of the preform relative to the insert of porous material, it is proposed that the negative pressure channel extend into a cavity in the insert.

Targeted local input of the action of the pressure ratios can be achieved by covering at least some of the area of the mandrel with a seal.

For mere partial remolding of the preform, it is conceivable that the mandrel be covered by a seal in the region of the round end.

A further variant for remolding the preform has the mandrel provided with at least one membrane that defines a distributor chamber.

A typical choice of material would be to form the porous material from a porous metal.

Particularly good thermal conductivity can be attained by using aluminum as the porous metal.

A further embodiment has a sintered metal used as the porous material.

These materials can be employed with variable pore sizes, from as small as a few μm and upwards. The smaller the pore size, the better the surface quality of the preform. Too small a pore size leads to too high a pressure/vacuum requirement. Moreover, small pores tend to get blocked by dust.

The following typical porous (air-permeable) materials are commercially available:
METAPOR® PORTEC AG;
"ultraporex®" ultarfilter [sic] international AG;
"PorceraxII®" International Mold Steel Inc.;
"KuporeX™" KUBOTA Corporation.

Figure 2:
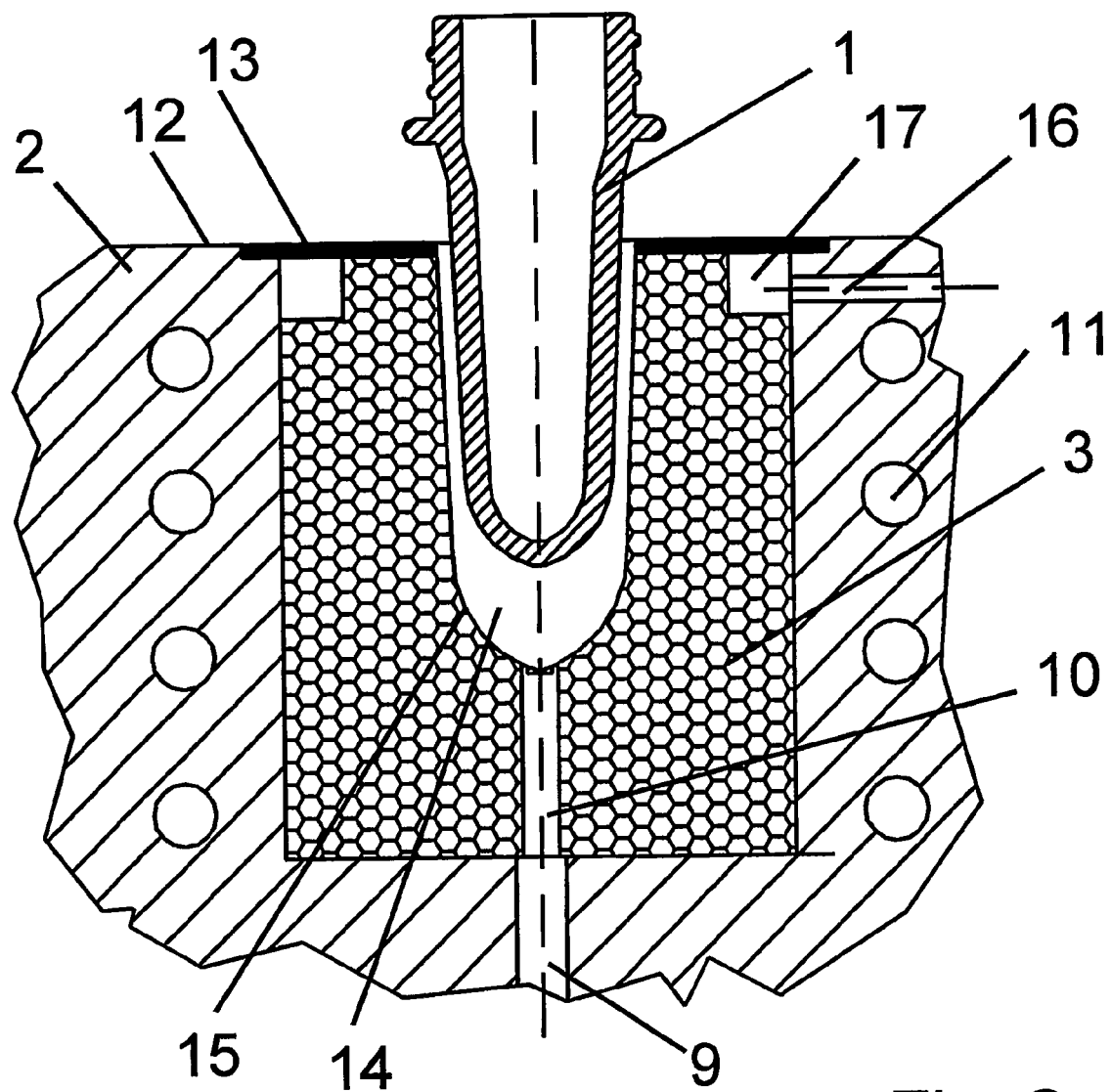
Figure 3:
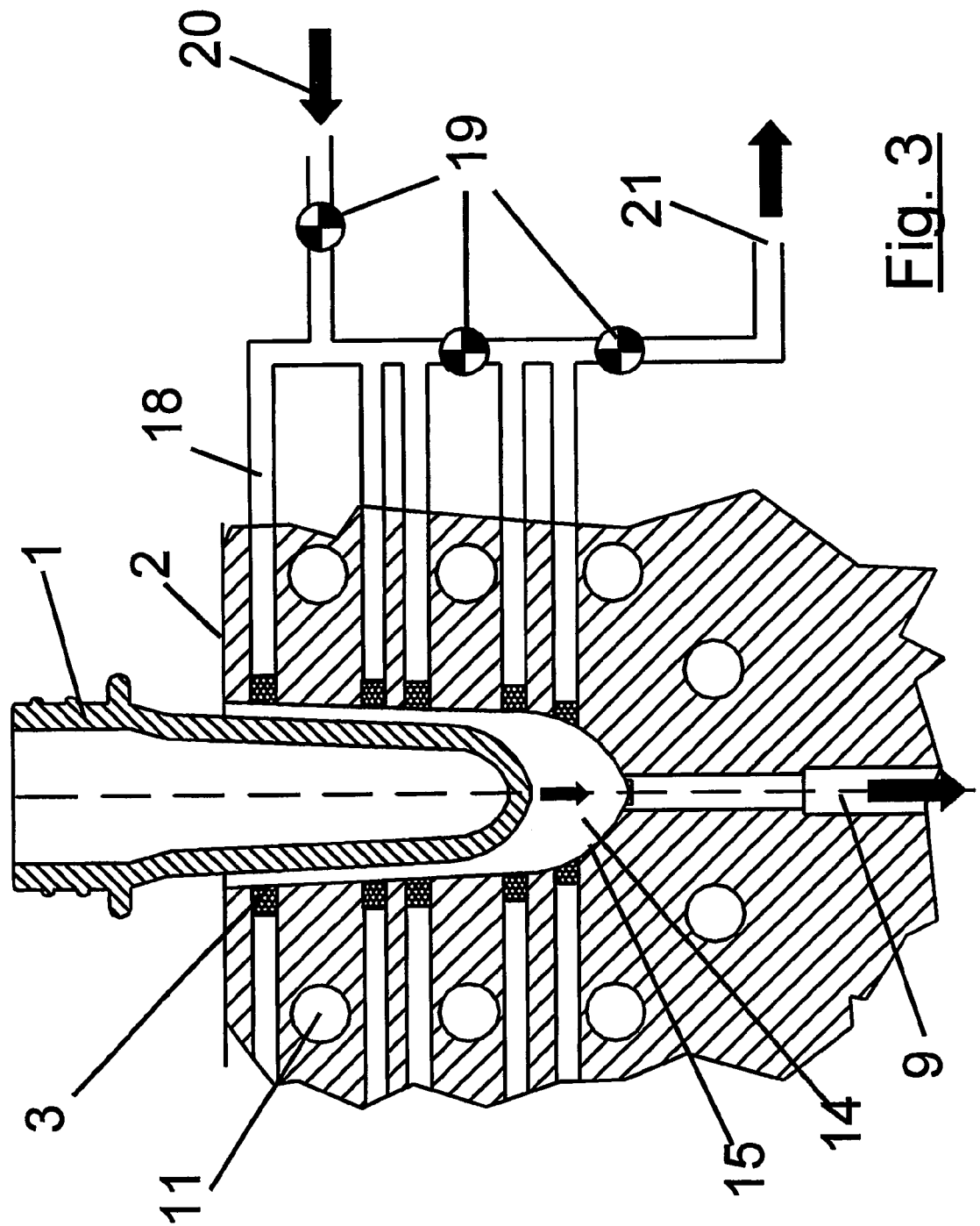
Figure 4:
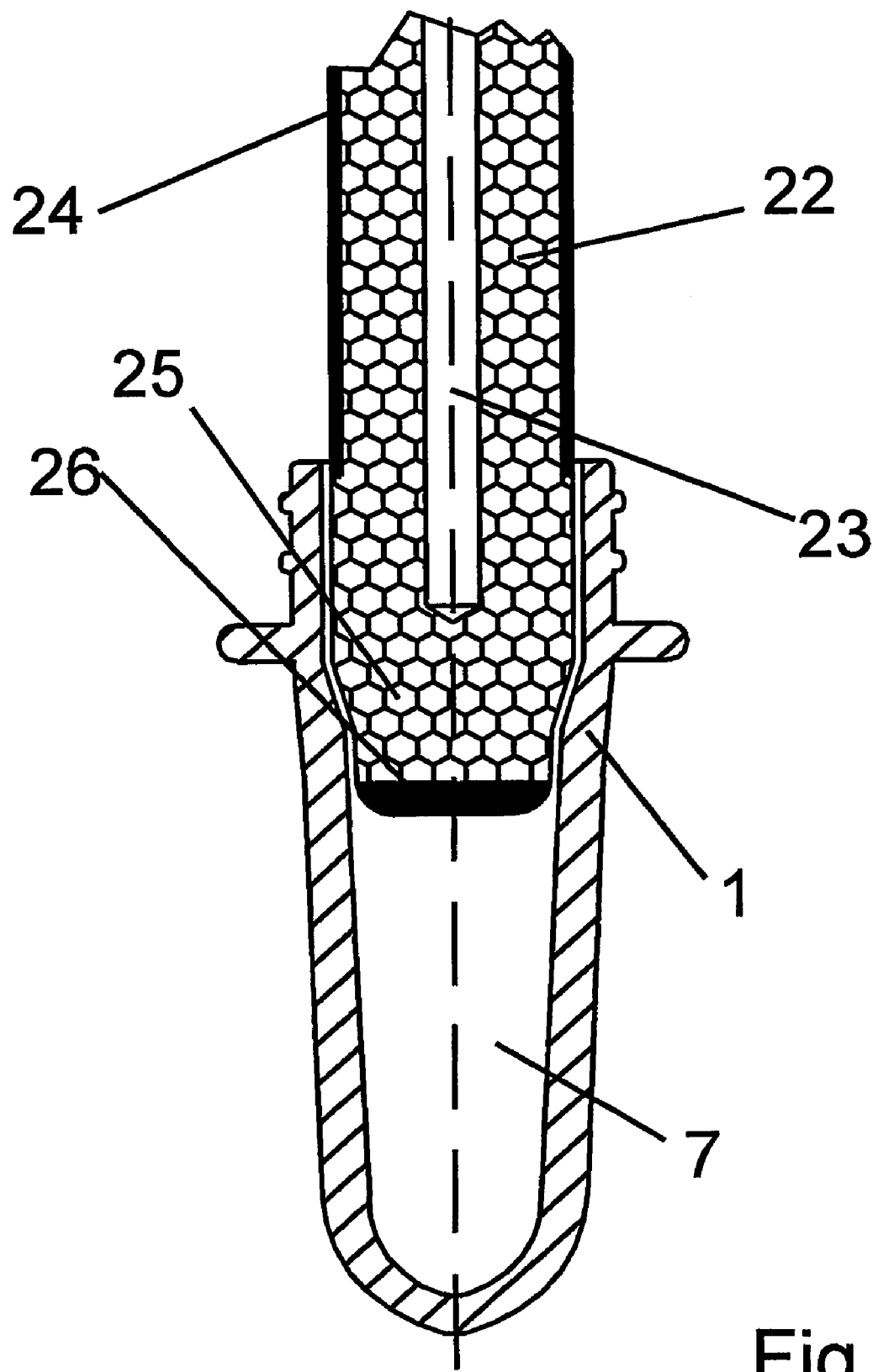
Figure 5:
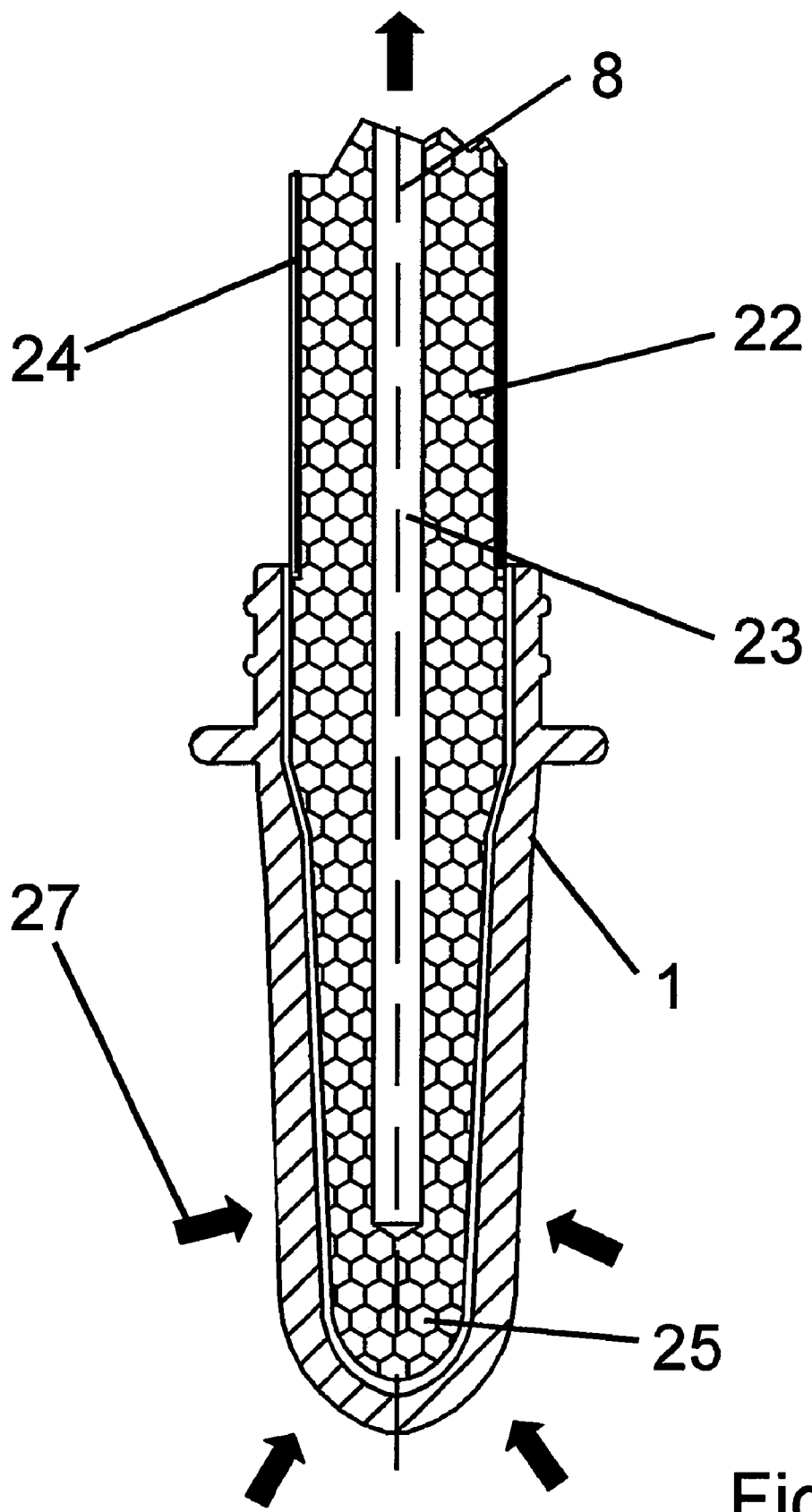
Figure 6:
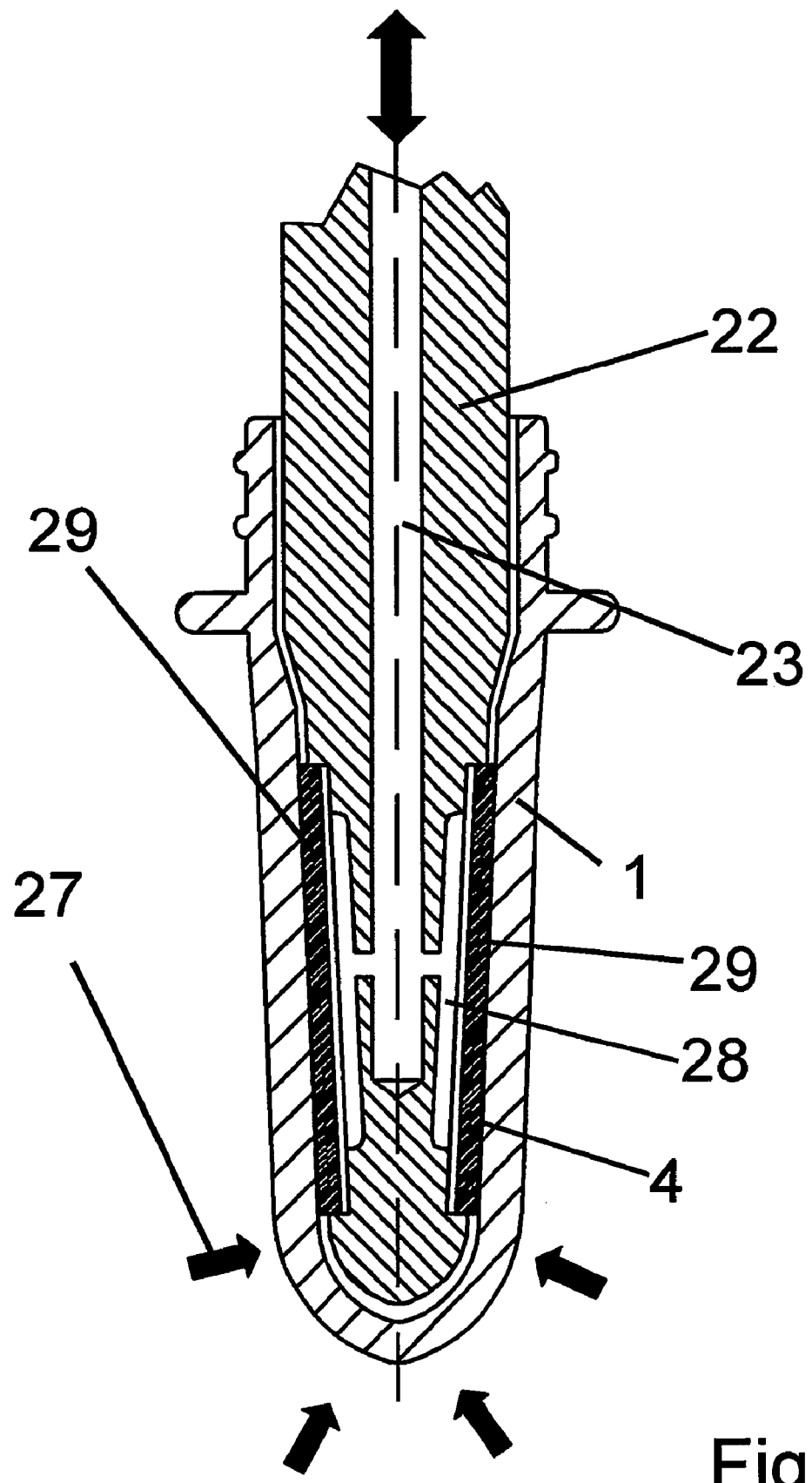
Figure 7:
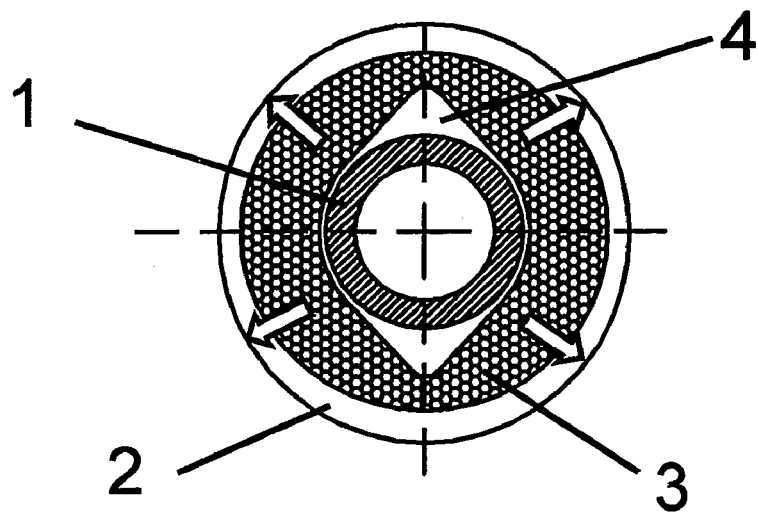
Figure 8:
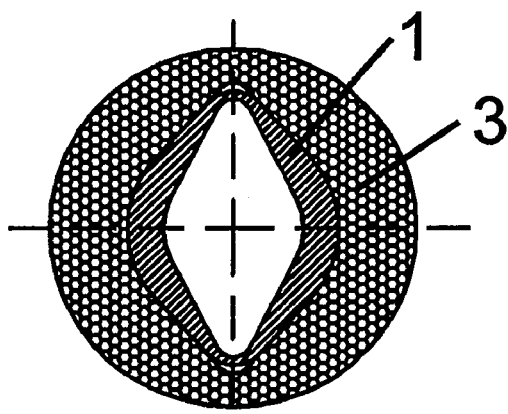
Figure 9:
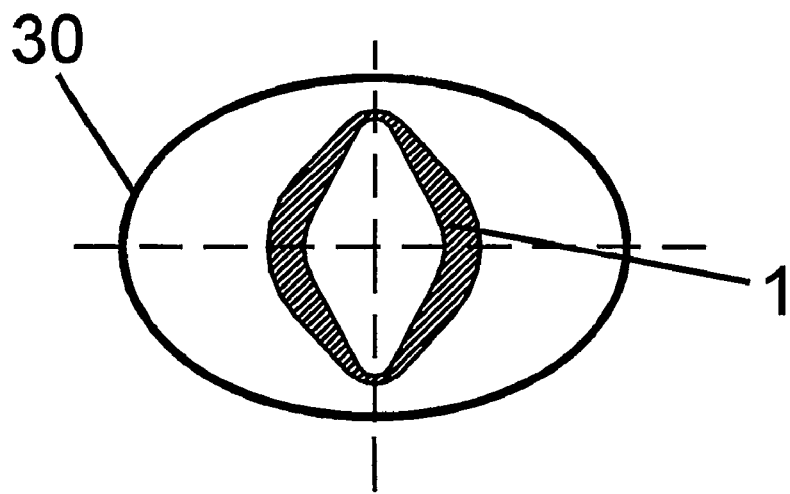

The drawings schematically present typical embodiments of the invention. Shown are:

FIG. 1 a cross-section through a cooling device in which a cooling sleeve is formed from a porous element;

FIG. 2 an embodiment modified in respect to FIG. 1, in which both overpressure and negative pressure can be applied to the preform through the porous element;

FIG. 3 a cross-section through an embodiment in which are employed a quantity of porous inserts spatially separated from each other and which are controllably connectable to overpressure and/or negative pressure;

FIG. 4 a partial representation of a vertical section through a device in which a mandrel for the preforms made of porous material is used for a partial remolding in the direction of the longitudinal axis of the preforms;

FIG. 5 an embodiment, modified in respect to FIG. 4, in which the mandrel is configured for a complete remolding of the preform;

FIG. 6 an embodiment, modified in respect to to FIG. 5, in which the molding forces are applied to the preform through a membrane mounted on the mandrel;

FIG. 7 a cross-section through a preform located in an insert of porous material;

FIG. 8 a cross-sectional representation according to FIG. 7 of the molding of the preform through the effects of negative pressure and FIG. 9 a schematic cross-sectional representation of a molded preform according to FIG. 8 and of a corresponding oval container contour after blow molding of the preform.

FIG. 1 shows a cross-section through a device for the processing of preforms (1), which has a frame (2) and an insert (3) in a porous material. The term "porous material" as used here includes both open-pored foamlike structures and sintered materials, or other comparable material structures. Owing to their high thermal conductivity, open-pore metal foams, for example of aluminum, have particularly proven themselves.

The preform (1) consists of a thermoplastic material, typically of PET (polyethylene phthalate), and is provided with a side wall (4), a support ring (5) and a mouth cutout (6). An internal space (7) of the preform extends along the preform longitudinal axis (8).

A negative pressure channel (9) extends through the frame (2) and is connected to a negative pressure channel (10) inside the insert (3). Also located in the area of the insert (3) are cooling channels (11) through which a cooling medium can circulate. In the region of the face (12) of the frame (2) a face of the insert (3) is closed off by a seal (13) to prevent the intake of ambient air when negative pressure is applied.

The preform (1) is introduced into a cavity (14) of the insert (3) in such a way that the support ring (5) abuts the area of the face of the insert (3). When negative pressure is applied to the insert (3), air located between the preform (1) and the cavity (14) is extracted and the ambient pressure in the inner space (7) of the preform (1) presses the side wall (4) of the preform (1) against the confining surface (15) of the cavity (14). The material contact thus caused leads to an improved cooling of the preform (1) and contributes to the preform (1) assuming the shape of the confining surface (15).

In the embodiment according to FIG. 2 the negative pressure channel (10) extends as far as the cavity (14) of the insert (3). Further, cooling channels (11) are located in the area of the frame (2). Additionally to the negative pressure channel (9), a pressure medium channel (16) is located in the area of the frame (2) and discharges into a pressurizing medium connection (17) of the insert (3). Preferably, the pressurizing medium line is located at a short distance from the seal (13). In this way a flow of air is induced through the cavity (14) in the direction of the negative pressure channel (9), facilitating the introduction of the preform (1) into the cavity (14) and preventing scratching of the preform (1) from contact with the confining surface (15). This further prevents uneven contact of the preform (1) with the insert (3), which can lead to uneven cooling of the preform (1).

In the embodiment according to FIG. 3 the cavity (14) is formed in the area of the frame (2) and a number of porous inserts (3) are arranged in the area of the confining surface (15) of the cavity (14). Here, the porous inserts (3) are spatially separated from each other. Additionally, the inserts (3) are each connected with supply channels (18) which are controllably connected by means of control valves (19) to a pressure source (20) or a negative pressure source (21). In this embodiment, too, the negative pressure channel (9) extends into the area of the cavity (14). To ease the introduction of the preform (1) into the cavity (14), at first vacuum is applied only to the negative pressure channel (9). As soon as the preform (1) is fully located in the cavity (14), the negative pressure source (21) delivers a higher negative pressure in order to press the preform (1) against the confining surface (15).

The inserts (3), spatially separated from each other, form nozzle-type arrangements, which can cause local deformation of the preform (1) or generate compressed air cushions for the preforms (1). More particularly, the possibility exists of introducing controllably hot compressed air through the inserts (3) so as to heat the preform (1) locally to achieve a specified deformation.

In the embodiment according to FIG. 4, the preform (1) is acted upon by a mandrel (22) which is formed from a porous material. The mandrel (22) is provided with a channel for a pressurizing medium (23). The channel for the pressurizing medium (23) can provide both overpressure and negative pressure, depending on control settings. To prevent pressure losses the mandrel (22) is externally provided with a seal (24) for part of its area. In the embodiment according to FIG. 4 the mandrel (22) is configured for only regional remolding of the preform (1) in the area of the mouth cutout (6) and of a part of the sidewall (4) oriented towards the mouth cutout (6). In the region of the round end (25), therefore, the mandrel (22) also bears a seal (26).

In the embodiment according to FIG. 5 the mandrel (22) is configured for a remolding of the preform (1) along the total extension of the longitudinal axis (8) of the preform. The mandrel (22) therefore possesses a contour that is altered in respect of the embodiment shown in FIG. 4. A seal (26) in the region of the round end (25) is not required in this embodiment. As well, when the preform (1) is acted upon by the mandrel (22), according to the embodiment shown in FIG. 5, the preform (1) can be cooled by cooling air (27) acting on it externally.

In the embodiment according to FIG. 6 the pressurizing medium channel (23) is connected to distributor chambers (28) which are sealed off by membranes (29). When pressure is applied to the pressurizing medium channel (23) the membranes (29) are pressed against the sidewall (4) of the preform (1) and cause the deformation of the preform (1). As well, the force generated by the membrane (29) can deform the preform (1) either against the inner wall of a cooling sleeve or as otherwise specified.

FIG. 7 shows a cross-section through an insert (3) with a preform (1) held in the cavity (14). The insert (3) is held in place by frames (2).

After application of negative pressure, the preform (1) according to FIG. 1 is molded into a preform as shown in FIG. 8. More particularly, it can be recognized in FIG. 8 that a varying wall thickness is created by deforming circumferentially. The preform configuration according to FIG. 8 is particularly suited for the production of oval bottles.

FIG. 9 shows the positioning of the preform (1) according to FIG. 8 for a container contour (30) of a container with oval cross-section. The material distribution in the preform (1) is selected so that those areas which are only relatively slightly extended in the subsequent blow molding will be formed more thinly than those areas which are more strongly extended in blow molding. With appropriate material distribution a blow-molded container can be given very uniform wall thicknesses and consequently uniform material characteristics.

In a combined alternating loading of the insert (3) with negative pressure and overpressure a cleaning of material can be simply performed so that, with no preform (1) in place, application of a pressurizing medium can blow impurities away. Separation of the preform (1) from the mandrel (22) can also be effected by pressurizing the mandrel (22). In a combined use of the mandrel (22) and an insert (3) of porous material, the separation of the preform (1) from the mandrel (22) can also be facilitated by an external application of negative pressure.

The invention claimed is:

1. A method for processing an injection molded thermoplastic preform, comprising the steps of:
   injection molding the preform;
   receiving the preform in an insert having a surface defining a cavity that is configured to substantially correspond to a length of an external portion of the preform received within the insert, wherein at least a portion of the surface of the insert comprises a porous material; and
   deforming the received preform by the action of negative pressure applied to the insert by extracting the air present between the surface of the insert and the preform through the porous material such that ambient pressure acting within the internal space of the preform presses an external portion of the preform against the surface of the insert.

2. The method according to claim 1 the step of deforming the received preform compensates for shrink mark defects in the preform.

3. The method according to claim 1 the step of deforming the received preform compensates for warpage defects in the preform.

4. The method according to claim 1 wherein the method further includes the step of sealing the external portion of the preform in cooperation with the insert by means of a seal in the insert to prevent the intake of ambient air when negative pressure is applied.

5. The method according to claim 1 wherein the method further includes the step of cooling the preform in said insert.

6. The method according to claim 1, wherein the method further includes the step of applying an input of locally varying pressure conditions along the surface of the insert.

7. The method according to claim 1 further comprising the steps of applying overpressure and negative pressure to the preform through a porous element of the insert.

8. The method according to claim 1, wherein the step of deforming the preform for varying of a circumferential distribution of material in a wall of the preform causes a remolding of the preform to effect an oval distribution of material in the wall of the preform.

9. The method according to claim 1 further comprising a step of blow molding the preform in a single-stage injection-blow process, and wherein the step of deforming the preform is carried out prior to the blow molding step.

10. The method according to claim 1 further comprising a step of blow molding the preform in a dual-stage injection-blow process, and wherein the step of deforming the preform is carried out prior to blow molding step.

11. A device for processing an injection molded thermoplastic preform, comprising:
    an insert having a surface defining a cavity that is configured to substantially correspond to the length of an external portion of the preform received therein; and
    at least a portion of the surface of the insert comprising a porous material for deforming the received preform by the action of negative pressure through the insert by extracting the air present between the surface of the insert and the preform through the porous material such that ambient pressure acting within the internal space of the preform presses the external portion of the preform against the surface of the insert.

12. The device according to claim 11 wherein the cavity defined in the insert is configured to compensate for shrink mark defects in the preform.

13. The device according to claim 11, wherein the cavity defined in the insert is configured to compensate for warpage defects in the preform.

14. The device according to claim 11 wherein the insert further comprising a negative pressure channel for providing the negative pressure to the porous material.

15. The device according to claim 11 wherein the insert includes a seal for sealing the preform portion in the insert cavity.

16. The device according to claim 11 wherein the insert further includes a negative pressure channel extending into the cavity.

17. The device according to one claim 11 wherein the insert is further configured to cool the preform therein.

18. The device according to claim 17 wherein the insert is configured to include a cooling channel therein.

19. The device according to claim 11 wherein the insert is arranged in a frame.

20. The device according to claim 19, wherein the frame is configured to include a cooling channel therein.

21. The device according to claim 11, wherein the insert is disposed in a cooling sleeve.

22. The device according to claim 11 wherein the insert includes a plurality of local porous inserts defining portions of the cavity.

23. The device according to claim 22 wherein the local porous inserts are temporarily and controllably connected by means of control valves to (i) a pressure source, and (ii) one or more negative pressure sources, for applying an input of locally varying pressure conditions along the surface of the insert.

24. The device according to claim 11, wherein the porous material comprises any one of:
a porous metal;
a porous metal including aluminum;
a porous metal including steel;
a porous metal including a copper alloy; and
a sintered metal.

25. The device according to claim 11 wherein the porous material includes variable pore sizes that are greater than a few μm.

26. The device according to claim 11, wherein the insert defines the cavity that is configured to vary a circumferential distribution of material in a wall of the preform to effect an oval distribution of material in the wall of the preform.

27. A method for processing an injection molded thermoplastic preform, comprising the steps of:
injection molding the preform;
receiving the preform on a mandrel with an internal portion of the preform on a surface of the mandrel, wherein at least a portion of the surface of the mandrel comprises a porous material; and
deforming the received preform by the action of negative pressure applied through the porous material to draw a preform portion into contact therewith.

28. The method according to claim 27, the step of deforming the received preform compensates for shrink mark defects in the preform.

29. The method according to claim 27 the step of deforming the received preform compensates for warpage defects in the preform.

30. The method according to claim 27 further includes the step of sealing the preform portion on the mandrel to prevent the intake of ambient air when negative pressure is applied.

31. The method according to claim 27 wherein the step of deforming the preform for varying of a circumferential distribution of material in a wall of the preform causes a remolding of the preform to effect an oval distribution of material in the wall of the preform.

32. A device for processing an injection molded thermoplastic preform, comprising:

a mandrel having a surface for receiving an internal portion of the preform;
at least a portion of the surface of the mandrel comprising a porous material configured to deform the received preform by negative pressure applied through the porous material to draw a preform portion into contact with said surface; and
the mandrel includes a seal for sealing the preform portion therein to prevent the intake of ambient air when negative pressure is applied.

33. The device according to claim 32, wherein the seal is configured for a round end of the mandrel for a partial remolding of the preform.

34. The device according to claim 32, wherein the mandrel comprises at least one membrane that defines a distributor chamber to remold the preform.

35. The device according to claim 32, wherein the porous material comprises any one of:
a porous metal;
a porous metal including aluminum;
a porous metal including steel;
a porous metal including a copper alloy; and
a sintered metal.

36. An injection molding machine including the device in accordance with any one of claims 11 to 26, 32 or 33 to 35.

37. The method according to claim 1, further comprising the step of effecting a pressure-supported mobility of the preform relative to the insert by means of a negative pressure channel in the insert extending into the cavity.

38. The method according to claim 1, further comprising the step of maintaining direct contact between the external portion of the preform and the surface of the insert throughout an entire cooling process for cooling the preform.

39. The method according to claim 1, further comprising the step of deforming the received preform by the action of overpressure by means of a pressure source that is connected to the insert.

40. The method according to claim 1, wherein the application of negative pressure to the preform takes place through local porous inserts.

41. The method according to claim 1, further comprising the step of applying an input of locally varying pressure conditions along the surface of the cavity by means of local porous inserts that are temporarily and controllably connected by means of control valves to a pressure source and to one or more negative pressure sources.

42. The method according to claim 1, further comprising the step of inducing a flow of air through the cavity in the direction of a negative pressure channel by means of a pressurizing medium connection to the insert, in order to facilitate the introduction of the preform into the cavity.

* * * * *